(12) United States Patent
Feldman

(10) Patent No.: US 6,431,120 B1
(45) Date of Patent: Aug. 13, 2002

(54) CATS TOWER ASSEMBLY

(76) Inventor: Peter Feldman, 25625 Greenfield Rd., Apt. #207, Southfield, MI (US) 48075

( * ) Notice: Subject to any disclaimer, the term of this patent is extended or adjusted under 35 U.S.C. 154(b) by 0 days.

(21) Appl. No.: 09/729,393

(22) Filed: Dec. 4, 2000

Related U.S. Application Data
(60) Provisional application No. 60/171,024, filed on Dec. 15, 1999, and provisional application No. 60/174,316, filed on Jan. 4, 2000.

(51) Int. Cl.$^7$ ................................................ A01K 15/02
(52) U.S. Cl. ........................................................ 119/706
(58) Field of Search ................................ 119/702, 705, 119/706; 482/35, 36

(56) References Cited

U.S. PATENT DOCUMENTS

| | | | |
|---|---|---|---|
| 4,047,502 A | * 9/1977 | Gordon, Jr. ................. | 119/706 |
| D250,784 S | * 1/1979 | Dieter et al. ................. | 482/35 |
| 4,497,279 A | * 2/1985 | Bell ............................ | 119/706 |
| 5,038,716 A | * 8/1991 | Olson ......................... | 119/706 |
| 5,151,069 A | * 9/1992 | Skalka ........................ | 482/35 |
| 5,806,464 A | * 9/1998 | Willinger et al. ........... | 119/706 |
| 5,829,390 A | * 11/1998 | Jonilla et al. ............... | 119/706 |
| 5,884,586 A | * 3/1999 | Carbonelli .................. | 119/706 |
| 6,024,053 A | * 2/2000 | Huang ........................ | 119/706 |

\* cited by examiner

Primary Examiner—Charles T. Jordan
Assistant Examiner—Elizabeth Shaw

(57) ABSTRACT

A separable cats tower having a footing, one or more pillars, several shelves, and a pair of struts. The footing and each shelf contain a beam. At installation assemblage the pillars are sequentially bolted one to another, the lowermost pillar is bolted to the beam of the footing, each shelf with its beam is bolted to one of the pillars, and each strut at its ends is bolted to the footing and to one of the pillars.

5 Claims, 5 Drawing Sheets

CATS TOWER ASSEMBLY

CROSS REFERENCE TO RELATED APPLICATIONS

This application claims the benefit of Provisional Patent Applications Ser. Nos. 60/171,024 and 60/174,316 filed Dec. 15, 1999 and Jan. 4, 2000.

BACKGROUND AND OBJECT OF THE INVENTION

It is well known that having pets at home is good for human beings. Pets entertain us, give us fun, and make our lives happier. And the most popular and therefore, the most numerous pets in the North America are cats. There are about 60 million domestic cats owned by approximately 30 percent of the USA families. As cats love to climb and like to be and to sleep in high places, articles of furniture known as cats trees, or cats towers are manufactured. Usually those trees and towers comprise a footing supporting one or more poles, or posts to which several shelves adapted to accommodate cats are attached. All those items are made as one integral piece and thus, they are bulky and therefore, inconvenient for handling and transporting. This circumstance makes those items unsuitable for shipping and trading and turns away many potential buyers of cats furniture. And as a matter of fact, most items of furniture at all are manufactured separable for shipping and handling reasons and often for consideration of transporting in customer's car.

So, an object of the present invention is a reliable in use cats tower that can be easy disassembled in parts and as well easy reassembled from these parts repeatedly and which is therefore considerably suitable for shipping and handling and also for transporting even in a small car. It is also an object of this invention a cats tower that has pretty simple structure and can be manufactured of ordinary mass-produced and retailed wood materials at reasonably low cost.

Embodiments of the cats tower of the present invention are depicted in the accompanying drawings wherein:

DETAILED DESCRIPTION OF THE INVENTION

Figure 1:
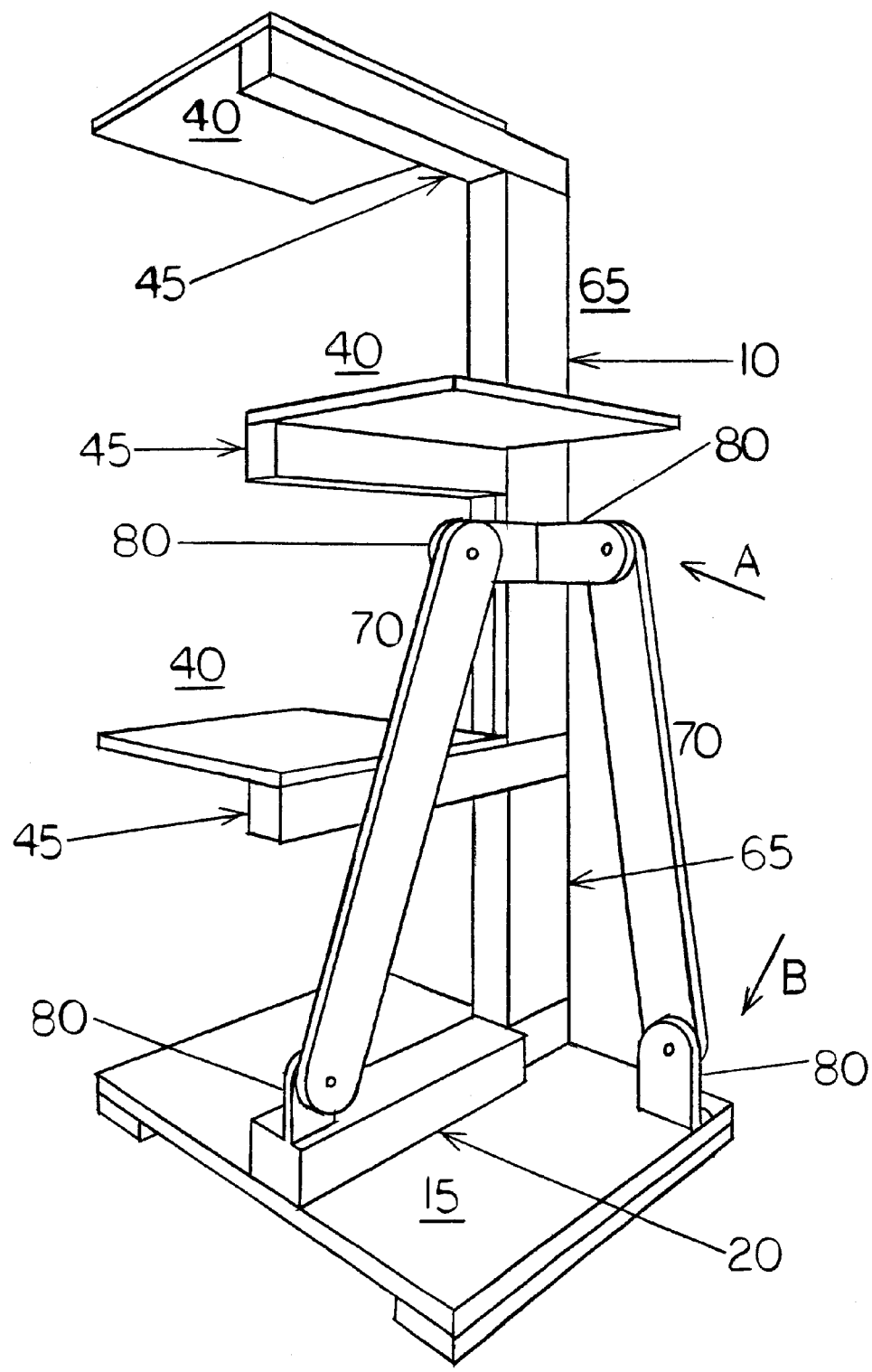
FIG. 1 (essentially illustrating the made and tested full-scale 4.5' height working model) is a perspective general view showing the entire tower having three shelves.

The cats tower (FIG. 1) includes a post, or pole 10, a foundation, footing, base, or pedestal (it can be just a plate) 15 to support the tower on ground, and a number of shelves 40 which are adapted to accommodate cats.

Figure 2:
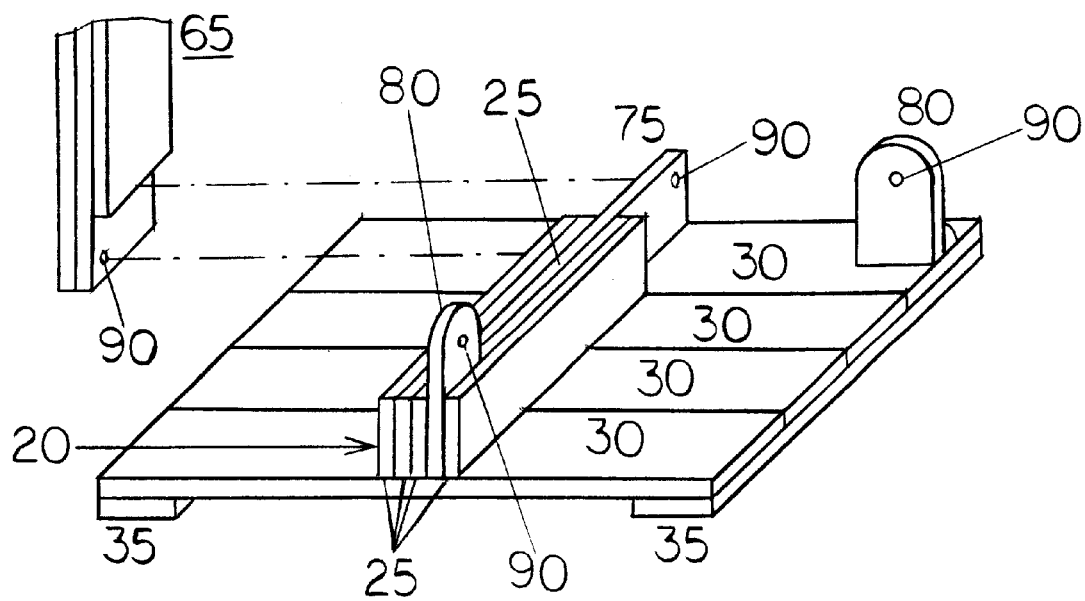
FIG. 2 is an exploded axonometric view showing the foundation and the attachment of the post to thereof.

Foundation 15 (FIG.2) is made of wooden boards and bars, plywood, particleboard, and such like and contains a wooden beam 20 for mounting the post on the foundation. In these embodiments the foundation has beam 20 and a wooden boarding. The boarding has a number of wooden and horizontal primary supporting boards 30, and two wooden horizontal secondary supporting boards 35. Beam 20 in these embodiments is built up of a number of horizontal rectangular wooden boards 25 positioned such that their edges are horizontal and their sides are vertical. Boards 25 are attached sequentially one to another side by side with their sides. The bottom edges of boards 25 are aligned one to another. At one end of beam 20 one board 25 forms a protrusion 75 over other boards 25. Boards 30 and 35 are positioned with their sides being horizontal. Boards 30 are perpendicular to beam 20 and attached to the bottom of the latter with their sides. Boards 30 are coextensive and sequentially abut one another with their edges—so, the boarding, if viewed from the above, looks rectangular. Boards 35 are parallel to beam 20 and perpendicular to boards 30 and attached to the latter at the ends thereof from the below sides to sides.

Figure 4:
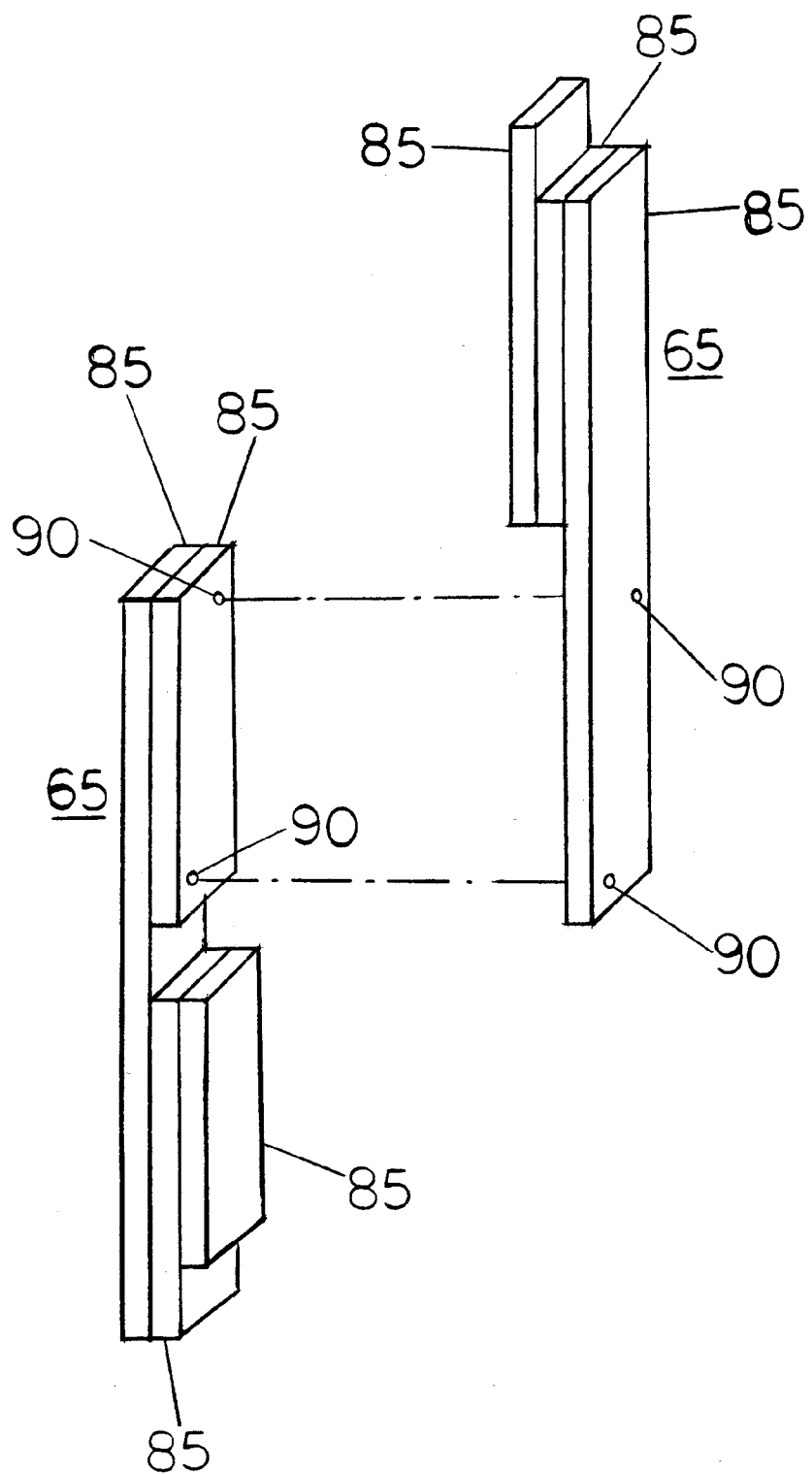
FIGS. 4, 5, and 6 are exploded axonometric views of the posts having respectively two pillars (for the tower with three shelves), three pillars (for the tower with four shelves), and only one pillar ( for the tower with two shelves)
Figure 5:
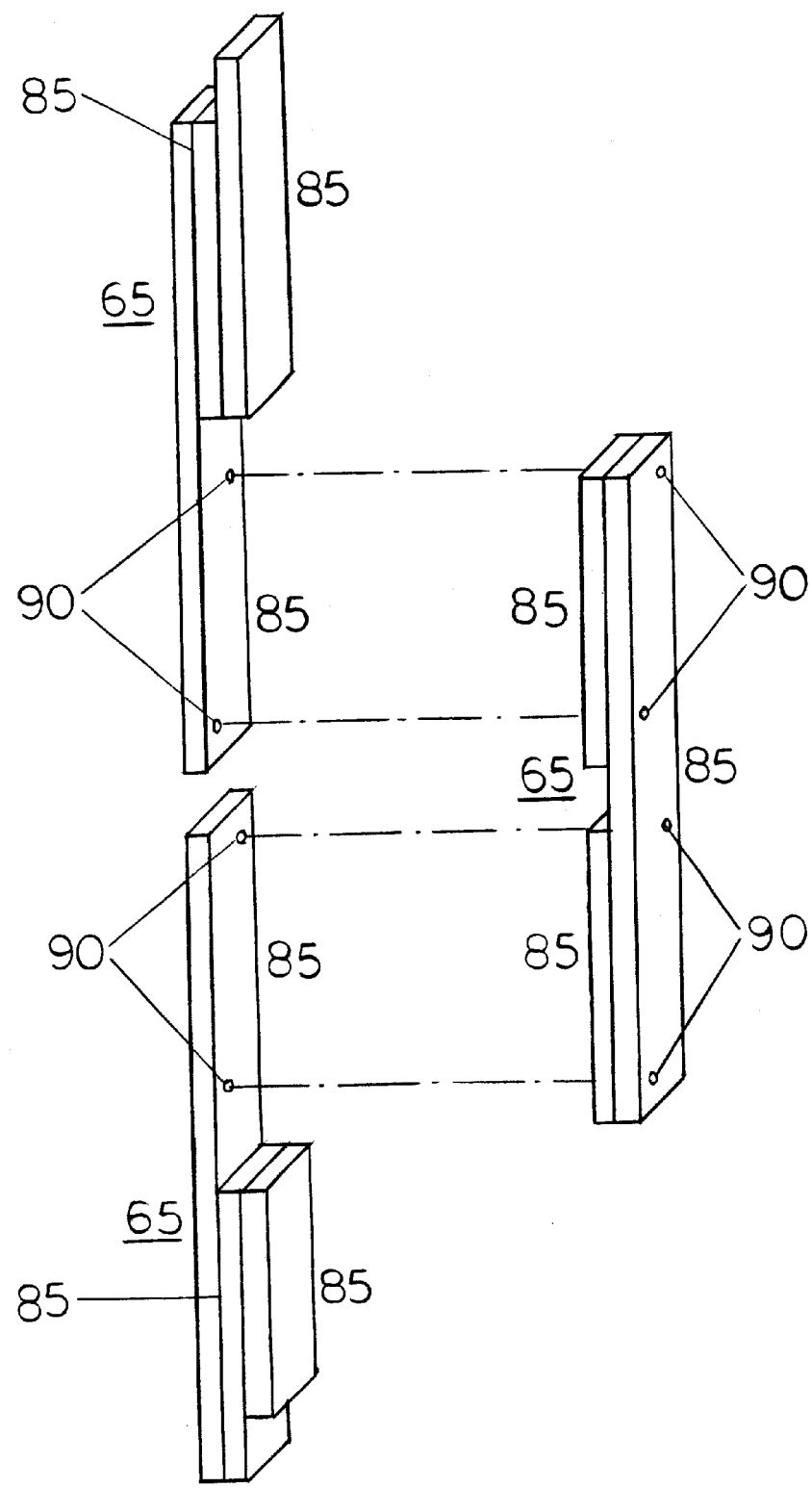
Figure 6:
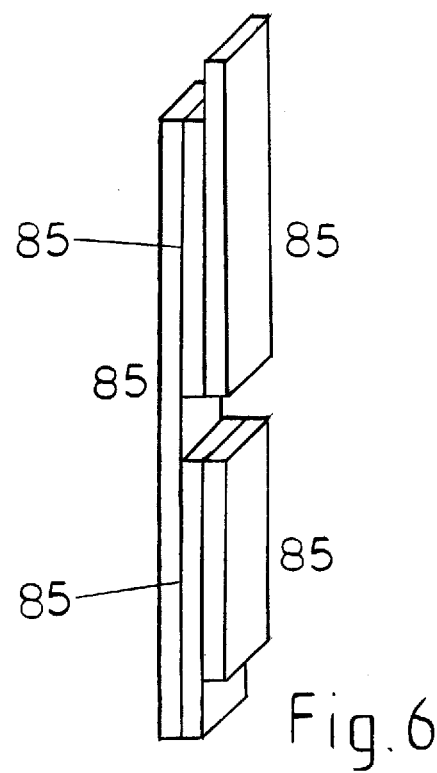
Figure 7:
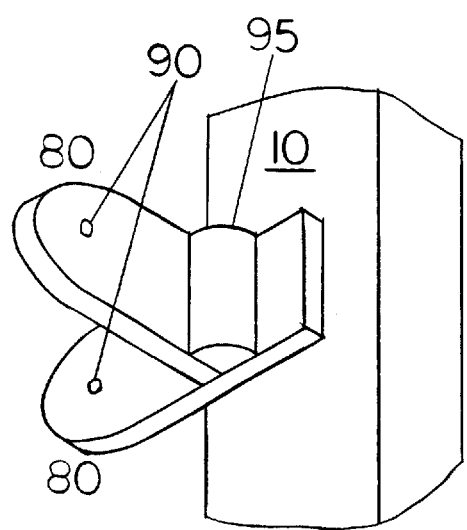
FIGS. 7 and 8 are fragmental isometric views (seen as shown accordingly by the arrows A and B in FIG. 1) showing possible arrangements of the mounts on one of the pillars and on the footing.
Figure 8:
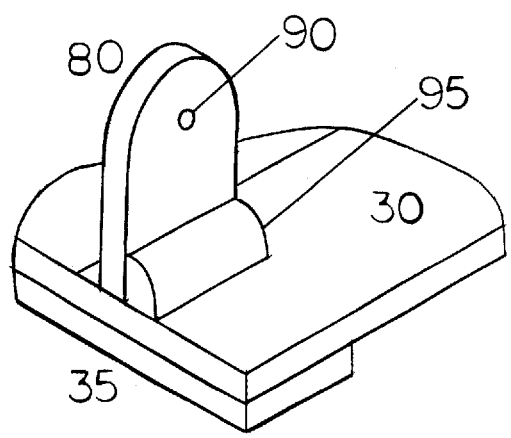

Post 10 (FIGS.4 to 6) is preferably upright and has a number of wooden pillars 65 (there can be only one, FIG. 6). In these embodiments each pillar 65 is built up of vertical wooden boards 85 of a same width flat-ways and lengthways attached one to another such that their edges are aligned one to another. Pillars 65 are sequentially bolted securely (this means, here and hereafter, that in the connection rotation of members or parts one relative to other around any single bolt is impossible; for example, one part to another is bolted by at least two bolts) one to another in an overlapping manner such that the lower portion of one (in these embodiments flat-wise) to the upper portion of another. The lowermost pillar 65 at its lower end is bolted (preferably securely) to foundation 15 (FIG. 2), i.e., to beam 20 (in these embodiments flat-wise to protrusion 75). The security of the bolting of the lowermost pillar 65 to protrusion 75 can be also provided by abutment of the pillar 65 against the ends of one or more (FIG. 2) boards 25.

Figure 3:
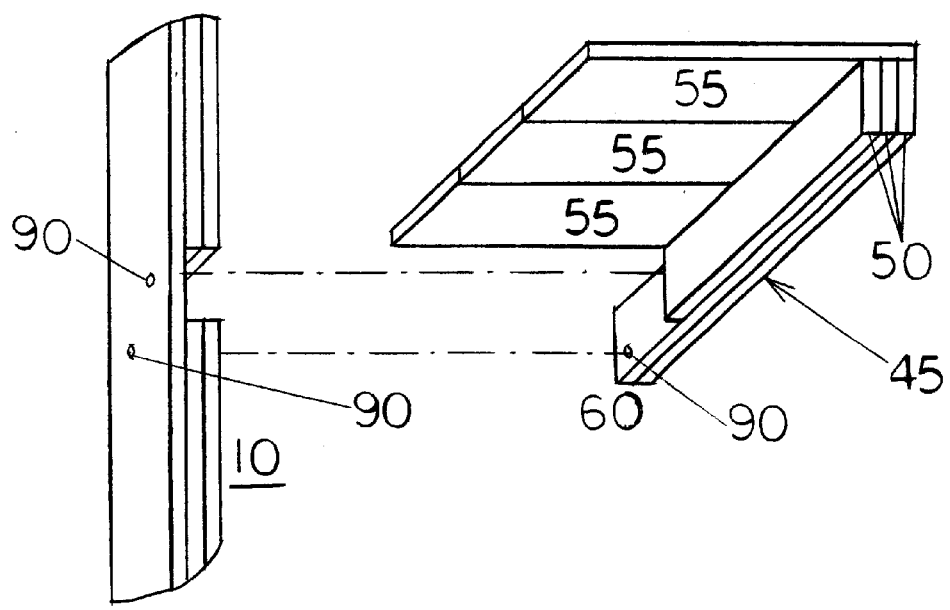
FIGS. 3 is an exploded axonometric view showing a shelf and the attachment thereof to the post.

Each shelf 40 (FIG. 3) is made of wooden boards and bars, particleboard, plywood, and such like and contains a wooden beam 45 to support the shelf on the post. Shelf 40 in these embodiments has beam 45 and a wooden boarding for accommodation of cats. Beam 45 in these embodiments is built up of three horizontal wooden rectangular boards 50. Boards 50 are positioned such that their edges are horizontal and their sides are vertical. Boards 50 are attached sequentially one to another side by side with their vertical sides. The top edges of boards 50 are aligned one to another. At one end of beam 45 two adjacent boards 50 form a protrusion 60 over third board 50. Shelf 40, i.e., beam 45 (in this embodiment flat-wise with protrusion 60) is bolted securely to one of pillars 65. The security of the bolting can be provided by abutment of the end of the non-protruding board 50 against the pillar 65 to which the beam is bolted. The security of the bolting can be also provided by abutment of beam 45 against the end of pillar 65 (or the ends of the pillars 65) contiguous with the pillar 65 to which the beam is bolted. The boarding has a number of horizontal wooden boards 55 (it can have only one wide enough board) perpendicular to beam 45. Each board 55 is attached flat-wise to the top of beam 45. Boards 55 preferably are coextensive and sequentially abut one another with their edges—then the boarding, if viewed from the above or from the below, looks rectangular.

In the places where contiguous pillars 65 are bolted one to another, one of them has two boards 85 and another—only one board 85. In the places where shelves 40 with protrusions 60 are bolted to pillars 65, the pillars have only one board 85. In the places where pillars 65 are not connected one to another and where shelves 40 are not connected to pillars 65, the pillars have three boards 85. The lowermost pillar at the place where it is connected to protrusion 75 of footing 15 has two boards 85. Pillars 65 and beams 45 are built up of boards of a same thickness and their sides are aligned one to another.

To stiffen the tower, it can also include a number of struts 70 (FIG. 1) which in these embodiments are wooden boards. Each of these embodiments has two struts 70. Each strut 70 is bolted to two wooden mounts 80 which in these embodiments are pieces of wooden boards (each board 70 at each of its ends is bolted to one board 80 side to side). In each two boards 80 to which is bolted one of struts 70 one board 80 is attached to foundation 15 (FIGS. 1, 2 and 8) and another is attached either to one of pillars 65 (FIGS. 1 and 7) or to one of shelves 40. One mount 80 for the first strut 70 is found between boards 25 (FIGS. 1 and 2), protrudes above them and is attached to them and the second mount 80 for this strut (FIGS. 1 and 7) is attached flat-ways to the outer side of one of outer boards 85 of one of pillars 65. One board 80 for the second strut 70 (FIGS. 1, 2 and 8) is attached with one of its ends from the above to the boarding of the footing and between them is attached a piece of wooden quarter-round molding 95 and another board 80 for this strut (FIGS. 1 and 7) with one of its ends is attached to the mount of the first strut located on the pillar and between them is also attached a piece of quarter-round wooden molding 95. In FIGS. 1, 2, 7, and 8 are shown only some of possible examples of attachments of mounts 80. There can be no mounts 80—the struts then are bolted just to the members of foundation 15, of post 10, and of shelves 40, or the parts of the tower can have means to which the struts can be bolted, e.g., attached to them metal brackets or so.

The members of the foundation, shelves and pillars one to another and the mounts to the pillars, foundation, and shelves can be attached by screwing, nailing, gluing, and so on. Pillars 65 can be single-sawn rectangular bars (or boards) bolted one to another side to side—then, if beams 45 and beam 20 are built-up like in these embodiments, the protrusions 60 and protrusion 75 are bolted to these bars or boards flat-ways. Beam 20 and beams 45 can be single-sawn (horizontal) rectangular—then, if pillars 65 are built-up like in these embodiments, they are bolted to these beams flat-wise or these beams are bolted to pillars 65 side to side if the latter are rectangular single-sawn bars or boards. The boarding of shelf 40 can be just a horizontal sheet of rigid wood material (peace of plywood, particleboard, and so forth) attached to the top of beam 45 (flat-wise if the latter is also horizontal and is built-up like in these embodiments or is rectangular single-sawn). Pillars 65 one to other, the lowermost pillar 65 to foundation 15 (i.e., to beam 20), shelves 40 (i.e., beams 45 of the shelves) to pillars 65, and struts 70 to mounts 80 or to foundation 15 and to pillars 65 or to shelves 40 are bolted at the installation assemblage of the tower—for this purpose the parts of the tower are provided with holes 90 in appropriate places. The lowermost pillar 65 to foundation 15 and shelves 40 to pillars 65 can be fixed at the manufacturing (in this case the foundation and the shelves can have accordingly no beam 20 and no beams 45 and be made integral with the pillars). The parts of this tower generally can be made of any rigid material (wood is preferable)—plastic, metal, etc. For installation assemblage instead of bolts other connecting means can be employed.

For the manufacturing of the parts of these embodiments of the tower are suitable Sweden pine boards of grade #2 with nominal thickness 1" (actual ¼"). For the bolting are suitable ordinary carriage bolts and caps and hex nuts with ¼" diameter. The top surfaces of the boardings of the footing and of the shelves are supposed to be covered with carpet. The struts and the portions of the pillars where they are not connected one to another and where the beams of shelves are not connected to them are supposed to be wound round with sisal rope. All other visible after installation assemblage surfaces of the tower are supposed to be painted or stained.

The described above examples of the tower of this invention are believed to be optimal designs regarding the separability, the stiffness, the installation assemblage, the manufacturing, the suitability for shipping, handling and transporting, and with respect of finishing for aesthetic consideration. When the tower is disassembled, its parts all together occupy as little space as less than half of the trunks of such a car like Ford Taurus. There can be a number of options and variations of the tower of the invention apparent to those skilled in the art. Nevertheless, the scope of the invention should be determined by the appended claims.

I claim:

1. A cats tower comprising:

a footing, base, pedestal, or foundation to support said tower on the ground, a post having one or more pillars securely connected at installation assemblage by fastening means sequentially one to another in an overlapping manner such that the lower portion of one to the upper portion to another, and a number of shelves adapted to accommodate cats;

said footing containing a beam to mount said post on said footing;

each said shelf containing a beam to support said shelf on said post;

the lowermost said pillar of said post at installation assemblage is securely connected by fastening means to said footing beam, each said shelf with its said beam at installation assemblage is securely connected by fastening means to one of said pillars.

2. A cats tower comprising:

a footing, base, pedestal, or foundation to support said tower on the ground, a post having one or more pillars securely connected at installation assemblage by fastening means sequentially one to another in a overlapping manner such that the lower portion of one to the upper portion to another, a number of shelves adapted to accommodate cats, and a number of struts;

said footing containing a beam to mount said post on said footing;

each said shelf containing a beam to support said shelf on said post;

the lowermost said pillar of said post at installation assemblage is connected by fastening means to said footing beam, each said shelf with its said beam at installation assemblage is securely connected by fastening means to one of said pillars;

each said strut at installation assemblage is connected by fastening means to said footing and to said post or one of said shelves so as to stiffen said tower.

3. A cats tower comprising:

one or more pillars at installation assemblage securely connected by fastening means sequentially one to another in an overlapping manner such that the lower portion of one to the upper portion of another so as to form a post, a footing, base, foundation, or pedestal to support said tower on the ground, and a number of shelves adapted to accommodate cats;

said footing containing a beam to mount said post on said footing;

the lowermost said pillar of said post is connected securely by fastening means at installation assemblage to said beam, each said shelf is attached securely to one of said pillars.

4. A cats tower comprising:

one or more pillars at installation assemblage securely connected by fastening means sequentially one to another in an overlapping manner such that the lower portion of one to the upper portion of another so as to form a post, a footing, base, foundation, or pedestal to support said tower on the ground, and a number of shelves adapted to accommodate cats;

the lowermost said pillar is attached securely to said footing;

each said shelf is attached securely to one of said pillars.

5. A cats tower comprising:

one or more pillars at installation assemblage securely connected by fastening means sequentially one to another in an overlapping manner such that the lower portion of one to the upper portion of another so as to form a post, a footing, base, foundation, or pedestal to support said tower on the ground, a number of shelves adapted to accommodate cats, and a number of struts;

said footing containing a beam to mount said post on said footing;

the lowermost said pillar of said post is connected by fastening means at installation assemblage to said beam, each said shelf is attached securely to one of said pillars;

each said strut at installation assemblage is connected by fastening means to said footing and to said post or one of said shelves so as to stiffen said tower.

* * * * *